United States Patent Office 3,305,594
Patented Feb. 21, 1967

3,305,594
STYRENE PRODUCTION
Davis B. Richardson, Amstelveen, Netherlands, and Jennings B. Du Bois, Jr., Pasadena, Tex., assignors to Shell Oil Company, New York, N.Y., a corporation of Delaware
No Drawing. Filed Oct. 9, 1964, Ser. No. 402,916
5 Claims. (Cl. 260—669)

This invention relates to an improved process for the production of styrene. More particularly, it relates to a process for the production of styrene from 1,5-cyclooctadiene by iodinative dehydrogenation procedures.

The dehydrogenation of hydrocarbons by reaction with iodine is now a well known procedure. See, for example, U.S. 3,080,435, issued March 5, 1963, to Nager. This reference typifies a number of patents wherein an organic compound is converted to a second organic compound having a higher carbon-to-hydrogen ratio by an iodinative conversion, e.g., an iodinative dehydrogenation. Such a process may provide the desired compounds with the increased carbon-to-hydrogen ratio by several reaction paths. One common type of iodinative dehydrogenation process results from simple dehydrogenation, e.g., the conversion of butane or butylene to butadiene. An alternate reaction type is a cyclization-aromatization process, illustrated by the conversion of propane or propylene to benzene. Provision has therefore been made for the conversion of light hydrocarbons, e.g., $C_2$ to $C_5$, to aromatic materials.

In a thermal treatment of conjugated dienes such as butadiene, a certain amount of oligimerization occurs whereby large-ring compounds such as cyclooctadienes are formed. It would be of advantage to provide a method for the conversion of such large-ring compounds to useful aromatic materials.

It is an object of the present invention to provide a process for the production of styrene. More particularly, it is an object of the present invention to provide a process for the conversion of large-ring hydrocarbons to styrene. A specific object is to provide a process for the iodinative conversion of 1,5-cyclooctadiene to styrene.

It has now been found that these objects are accomplished by the process of contacting 1,5-cyclooctadiene with elemental iodine at elevated temperature. Under the conditions of the process of the invention, 1,5-cyclooctadiene is converted to styrene in good yields. In spite of the complex nature of the overall chemical transformation, involving dehydrogenation, isomerization, and aromatization, high selectivity for styrene production is observed.

Broadly speaking, the invention contemplates the iodinative conversion of 1,5-cyclooctadiene to styrene by contact with elemental iodine at elevated temperature. Certain basic problems are common to all such procedures. One problem involves the separation of the dehydrogenated products from the hydrogen iodide product in order to prevent the combination thereof, which results in the loss of iodine in the form of organic iodides and reduction of product yield. An additional problem arises from the necessity for regeneration of iodine from the by-product iodide species, at least initially hydrogen iodide, to enable the reaction process to be conducted in an economical manner. Such problems may be overcome in the process of the invention by various operating procedures.

In one modification of the process of the invention, the prevention of the recombination of olefin and hydrogen iodide is accomplished by withdrawing the reaction mixture from the reaction zone and quickly removing substantially all the hydrogen iodide and iodine, as by contacting the effluent from the reactor with water. Such a procedure is illustrated and discussed extensively in U.S. 2,901,520, issued August 29, 1959, to Raley et al. The process of the present invention, when conducted in such a manner, comprises reacting a gaseous mixture of the 1,5-cyclooctadiene reactant with iodine at an elevated temperature, at least above about 300° C. for a period of from about 0.1 to about 7 seconds, quickly withdrawing the reaction mixture from the reaction zone and removing the hydrogen iodide and unreacted iodine as by treatment with water.

An improvement in this process is described in U.S. 2,890,253, issued June 9, 1956, to Mullineaux et al. This patent describes the beneficial results to be obtained by inclusion within the initial reaction mixture amounts of oxygen. In the presence of this oxygen, the product hydrogen iodide is oxidized under the conditions of the process to elemental iodine which is capable of reacting further with additional hydrocarbon. By such a process, the amount of iodine required to effect the dehydrogenation or similar conversion of a given amount of hydrocarbon feed is substantially reduced. Thus, by reacting 1,5-cyclooctadiene, iodine and oxygen according to the procedure described in U.S. 2,890,253, good yields of styrene are observed and substantial savings in the required amount of iodine are obtained.

In an alternate modification of the process of the invention, 1,5-cyclooctadiene is reacted with iodine in the presence of certain metallic oxides, hydroxides or carbonates, which are employed as hydrogen iodide acceptors. For example, calcium oxide may be utilized to react with the hydrogen iodide present in the product mixture, thereby lowering the hydrogen iodide concentration and reducing the probability of undesired side reactions. This technique for effecting iodinative dehydrogenation is described in U.S. 3,130,241, issued April 21, 1964, to Baijle et al. When such a procedure is applied to the process of the present invention, 1,5-cyclooctadiene and iodine are introduced to a reactor wherein the compound employed as the hydrogen iodide acceptor is maintained. The hydrogen iodide formed by the reaction of the cyclooctadiene and iodine unites with the metal compound to form the corresponding metal iodide and, customarily water. Periodically during reaction, the feed stream containing the cyclooctadiene and iodine is halted or diverted to an alternate reaction vessel whereupon the metal iodide is converted to elemental iodine and the metal oxide by passing oxygen thereover. The iodine thereby recovered is separated and is recycled for further operation. Alternatively the metal iodide/metal oxide is circulated continuously in a fluidized state between reaction and regeneration zones.

In the preferred modification of the process of the invention, the conversion of 1,5-cyclooctadiene to styrene is effected by contacting the cyclooctadiene with iodine in a molten medium, which medium comprises at least one metal compound which serves as an iodine precursor for in situ production of iodine or alternatively as a hydrogen iodide acceptor. Such a process may be effected by mixing the cyclooctadiene and elemental iodine, passing the mixture through an at least partially molten mixture of a hydrogen iodide acceptor, preferably a molten metal oxide or hydroxide such as lithium oxide or hydroxide, and recovering the styrene from the effluent thereof. Better results are obtained, however, when the reaction mixture comprises a mixture of the cyclooctadiene and oxygen, and the reaction mixture is passed through an at least partially molten medium comprising at least one molten metallic iodide from which iodine is liberated through oxidation by oxygen under the conditions of the reaction. In such a process the oxygen introduced reacts with the metal iodide present to produce elemental iodine in situ in the reaction vessel and converts the metal iodide to the corresponding oxide. The iodine produced is capable of effecting the iodinative conversion of the cyclooctadiene feed, thereby producing the desired styrene product and hydrogen iodide, which hydrogen iodide combines with the metallic oxide present to reform metallic iodide and produce water. It is also possible to add the cyclooctadiene feed and the oxygen separately, as by conducting the iodinative conversion of the cyclooctadiene in one reaction zone and regenerating iodine through reaction of metallic iodide and oxygen in a second zone. The net result of the reaction sequence is that cyclooctadiene and oxygen react to produce styrene and water. For a more extensive discussion of such process consideration, reference is made to U.S. 3,080,435.

Regardless of the method of contacting the cyclooctadiene and iodine, and the method of hydrogen iodide removal, it has been found desirable to conduct the conversion of 1,5-cyclooctadiene to styrene under rather specific reaction conditions.

The molar ratio of the reactants is preferably such that iodine is employed in amounts equal to or in excess of the cyclooctadiene. From stoichiometric considerations of the conversion of 1,5-cyclooctadiene ($C_8H_{12}$) to styrene ($C_8H_8$) it is apparent that two moles (4 g.-atoms) of iodine are required for the conversion of each mole of the cyclooctadiene. It is therefore preferred to employ a ratio of reactants such that there are at least two moles of iodine present for each mole of cyclooctadiene. Although there does not appear to be any substantial detriment arising from the use of larger amounts of iodine, amounts of iodine greater than about 8 moles per mole of cyclooctadiene appear to offer no further advantage. Molar ratios of iodine to cyclooctadiene from about 2:1 to about 8:1 are therefore satisfactory, although molar ratios of from about 2:1 to about 6:1 are preferred.

It should be understood that actual mixing and contacting of cyclooctadiene and iodine per se is not required, for as indicated above it is equivalently useful and frequently preferred to mix the olefin and oxygen and contact with this mixture a metallic iodide from which iodine is liberated by reaction with oxygen. In such cases, the amount of iodine present at any one time will be negligible, and the "potential iodine" is determined by the amount of oxygen present. As one mole of oxygen is chemically equivalent to two moles of iodine in the present process, the mole ratio of oxygen to cyclooctadiene is preferably at least about 1:1. By comparison with the above-expressed preferences, when oxygen is employed as the source of in situ iodine, molar ratios of oxygen to cyclooctadiene from about 1:1 to about 4:1 are satisfactory while molar ratios of from about 1:1 to about 3:1 are preferred and best results are obtained when molar ratios from about 1.5:1 to aboout 2.5:1 are employed. It should be understood that the use of pure oxygen is not required, and oxygen diluted with inert gases such as nitrogen, argon, helium, steam, and the like is satisfactory and may be efficiently utilized in the process of the invention. Frequently, it is advantageous and generally satisfactory to employ air as the source of oxygen for an in situ formation of iodine.

The temperature at which the process of the invention is conducted is normally held within the range of from about 800° F. to about 1200° F., although preferably the reaction temperature is within the range of from about 900° F. to about 1100° F. Within this temperature range, styrene is produced by iodinative conversion of 1,5-cyclooctadiene in good yields with short contact times, which times typically vary from about 0.1 second to about 7 seconds, but preferably vary from about 0.5 seconds to about 5 seconds. It has been found that by the use of such short contact times and high temperatures, the production of styrene is favored and the thermal decomposition of the cyclooctadiene to butadiene and other light hydrocarbons is retarded.

When, as in the preferred modification of the process of the invention, a cyclooctadiene-oxygen mixture is contacted by a molten salt comprising at least one metallic iodide, the preferred melt which is most advantageously employed is composed initially of from 75–99% by weight of lithium iodide and from 25–1% by weight lithium hydroxide. Anhydrous salts are most efficiently used but reagent grade lithium iodide is also suitable for utilization subsequent to the removal of the water normally found therein. After the process has been operated for a time, the molten salt mass will contain various amounts of impurities. Ordinarily it is desirable to keep such additional melt constituents to a minimum concentration, for example, not more than about 10% by weight.

The cyclooctadiene and oxygen may be fed separately to the melt, although it is generally preferred to mix the materials prior to introduction into the reaction zone and frequently it is advantageous to employ preheating means to promote extensive vaporization of the cyclooctadiene reactant prior to introduction into the reaction zone. The reaction mixture and the melt may be contacted as by passing the gaseous mixture over the molten salt, by bubbling the mixture through the melt, or by other conventional contacting procedures. Subsequent to reaction, the effluent from the reaction zone is condensed and separated by any suitable conventional means.

While the above discussion and the examples below principally relate to the process of contacting a cyclooctadiene-oxygen mixture and a molten metallic iodide, it should be understood that other related processes, e.g., processes similar to those described in U.S. 2,901,520, in U.S. 2,890,253 and U.S. 3,130,241 discussed herein may also suitably be employed.

The process of the invention is suitable for the efficient conversion of 1,5-cyclooctadiene to styrene. It should be appreciated that the 1,5-cyclooctadiene employed need not be a pure material, but may be mixed with other materials of lesser, equal or higher molecular weight. Particularly suitable as a source of cyclooctadiene is a mixture of butadiene dimers. It is known that butadiene thermally dimerizes to a mixture containing 1,5-cyclooctooctadiene along with 4-vinylcyclohexene-1 and related compounds. When such a mixture is treated according to the conditions of the present invention, the 1,5-cyclooctadiene present is converted with high selectivity to styrene. It is also possible that other butadiene dimers, particularly the vinylcyclohexene, will also be converted to styrene thus making possible an efficient process for the production of styrene from butadiene by initially thermally dimerizing the butadiene and subsequently subjecting the dimer mixture to the iodinative conversion of the present invention.

It should be realized that the butadiene may be produced by iodinative dehydrogenation of butane and/or n-butylene, thus indicating the suitability of a multi-step process comprising the iodinative conversion of a butane and/or n-butylene fraction to butadiene, dimerizing the butadiene product to a mixture containing 1,5-cyclooctadiene, and finally passing the dimer mixture to the same or a related reaction zone to effect the conversion to styrene.

To further illustrate the process of the invention, the following examples are provided. It should be understood that the details thereof are not to be regarded as limitations, as they may be varied as will be understood by one skilled in this art.

*Example 1*

A series of 1,5-cyclooctadiene iodinative conversions to styrene were effected in a horizontal baffled-pipe reactor charged with a mixture of approximately 95–98% weight lithium iodide and approximately 5–2% weight lithium hydroxide under varying reaction conditions. The results of these experiments are shown in Table I.

TABLE I.—IODATIVE CONVERSION OF 1,5-CYCLOOCTADIENE

| Experiment No. | 1 | 2 | 3 | 4 | 5 | 6 |
|---|---|---|---|---|---|---|
| Reactor Temperature, °F | 1,000 | 1,000 | 1,000 | 1,000 | 1,000 | 1,000 |
| Residence Time, sec. | 2 | 3 | 3 | 3 | 3 | 3 |
| $O_2$/Feed, Mole/Mole | 0 | 1.0 | 1.0 | 1.2 | 1.0 | 2.5 |
| $O_2/H_2O$, Mole/Mole | 0 | 0.5 | 0.5 | 0.5 | 0.5 | 0.5 |
| Feed Flasher Temperature, °F | 700 | 1,000 | 400 | 400 | 925 | 925 |
| Conversion, percent | 100 | 100 | 100 | 100 | 100 | 100 |
| Selectivity, Percent w. Carbon: | | | | | | |
| $CH_4$ | 0.1 | 0.5 | | 0.5 | 0.7 | 0.4 |
| $C_2H_2$ | 0.1 | 0.2 | | | | |
| $C_2H_4$ | 0.2 | 1.5 | 2.1 | 2.6 | 1.6 | 2.0 |
| $C_2H_6$ | | 0.4 | 0.5 | 0.5 | 0.3 | 0.2 |
| $C_3H_6$ | 0.9 | 1.0 | 0.6 | 0.5 | 0.5 | 0.2 |
| $C_3H_8$ | | | | 0.1 | 0.1 | |
| n-$C_4H_6$ | 43.1 | 10.2 | 2.7 | 1.6 | 3.9 | 4.0 |
| n-$C_4H_8$ | 7.0 | 0.2 | | 0.1 | 0.2 | 0.1 |
| n-$C_4H_{10}$ | | 17.6 | 4.7 | 4.1 | 11.2 | 8.4 |
| i-$C_5H_8$ | | 0.3 | 0.1 | 0.1 | 0.1 | 0.1 |
| Benzene | 1.0 | 7.4 | 10.0 | 10.2 | 6.7 | 7.4 |
| Toluene | 0.6 | 4.5 | 5.0 | 4.6 | 2.8 | 2.8 |
| 4-vinylcyclohexene | 35.3 | 0.6 | 2.7 | 1.8 | 1.3 | |
| Bicyclo(3.3.0)oct-2-ene | | 2.2 | 13.9 | 8.7 | 5.0 | 0.6 |
| Ethylbenzene | 2.3 | 14.9 | 20.1 | 22.4 | 27.0 | 18.6 |
| Styrene | 2.2 | 30.1 | 24.0 | 31.6 | 33.5 | 44.4 |
| Unknown $C_8$'s (number) | 7.1 (6) | 5.0 (4) | 10.5 (8) | 7.2 (9) | 2.9 (5) | 0.8 (6) |
| CO | | 0.1 | | 0.1 | 0.1 | 1.1 |
| $CO_2$ | | 3.3 | 2.6 | 3.3 | 2.2 | 8.8 |
| Carbon Balance, percent w. | 87 | 86 | 101 | 98 | 97 | 102 |

Experiment 1 illustrates the thermal conversion of 1,5-cyclooctadiene to products in the substantial absence of iodine (no oxygen was employed to liberate free iodine from the metal iodide). It should be noted that although some rearrangement to 4-vinylcyclohexene did take place, the major product was butadiene resulting from reactant decomposition. Experiments 2–6 demonstrate the improved production of styrene in the presence of the elemental iodine produced by reaction of the added oxygen with the metal iodide. Experiment 6 illustrates the beneficial results obtained when an oxygen-to-feed ratio (mole/mole) greater than 1.5 is employed. The major by-product in each experiment conducted in the presence of iodine is ethylbenzene, which is, of course, also convertible into styrene by additional contact with iodine under similar reaction conditions.

We claim as our invention:

1. The process of producing styrene by contacting 1,5-cyclooctadiene with from about 2 to about 8 moles of elemental iodine per mole of the cyclooctadiene, at a temperature from about 800° F. to about 1200° F.

2. The process of producing styrene by contacting 1,5-cyclooctadiene with from about 2 to about 8 moles of elemental iodine per mole of the cyclooctadiene, at a temperature from about 900° F. to about 1100° F., the time of said contacting being from about 0.1 second to about 7 seconds, and substantially immediately removing product hydrogen iodide from the resulting product mixture.

3. The process of producing styrene by contacting 1,5-cyclooctadiene with a molten salt environment at a temperature from about 800° F. to about 1200° F., said molten salt comprising at least one metallic iodide, and introducing from about 1 to about 4 moles of oxygen per mole of the cyclooctadiene into the molten salt environment, thereby liberating elemental iodine from the metallic iodide for reaction with the cyclooctadiene.

4. The process of producing styrene by contacting 1,5-cyclooctadiene with a molten salt environment at a temperature from about 900° F. to about 1100° F., said molten salt comprising at least one metallic iodide, and introducing from about 1 to about 3 moles of oxygen per mole of the cyclooctadiene into the molten salt environment, thereby liberating elemental iodine from the metallic iodide for reaction with the cyclooctadiene.

5. The process of claim 4 wherein the metallic iodide is lithium iodide.

References Cited by the Examiner

UNITED STATES PATENTS 2,719,171  9/1955  Kalb et al. _____ 260—669 X
3,106,590  10/1963  Bittner et al. _____ 260—669 X DELBERT E. GANTZ, *Primary Examiner.*

C. R. DAVIS, *Assistant Examiner.*